United States Patent [19]

Ippommatsu et al.

[11] Patent Number: 5,147,735
[45] Date of Patent: Sep. 15, 1992

[54] METHOD OF OPERATING A SOLID ELECTROLYTE FUEL CELL

[75] Inventors: Masamichi Ippommatsu; Akira Hirano, both of Hyogo; Hirokazu Sasaki, Osaka, all of Japan

[73] Assignee: Osaka Gas Company Limited, Osaka, Japan

[21] Appl. No.: 533,268

[22] Filed: Jun. 4, 1990

[30] Foreign Application Priority Data

Jun. 9, 1989 [JP] Japan .................. 1-147973

[51] Int. Cl.$^5$ .......................... H01M 8/04
[52] U.S. Cl. ...................... 429/17; 429/30; 429/31
[58] Field of Search ............. 429/17, 20, 30, 31

[56] References Cited

U.S. PATENT DOCUMENTS

| | | | |
|---|---|---|---|
| 3,460,991 | 8/1969 | White | 429/30 |
| 4,128,700 | 12/1978 | Sederquist | 429/17 |
| 4,547,437 | 10/1985 | Isenberg et al. | 429/30 |
| 4,876,163 | 10/1989 | Reichner | 429/30 |
| 4,888,254 | 12/1989 | Reichner | 429/31 |

FOREIGN PATENT DOCUMENTS 57-130381 8/1982 Japan .

OTHER PUBLICATIONS

Riquarts et al., "Linde Reports on Science and Technology: Gas Separation Using Pressure Swing Adsorption Plants", No. 40, 1985, pp. 26–35.
Linde, "Plants for the Production of Pure Hydrogen from Light Hydrocarbons", 1983.
Voss, "Status of Fuel Cell Development", Fuel Cell Workshop at Taormina/Sicily, Jun. 6, 1987, Comm. of the European Communities.

Primary Examiner—Stephen Kalafut
Attorney, Agent, or Firm—Jordan and Hamburg

[57] ABSTRACT

In a method of operating a solid electrolyte fuel cell using a light hydrocarbon such as a natural gas, naphtha or the like as the fuel oxygen-enriched air is passed to the air electrode side and a fuel prepared by steam reformation of a hydrocarbon to the fuel electrode side and the fuel is recycled. The results are improved performance in that the method offers a high output density and entails no loss of fuel.

1 Claim, 2 Drawing Sheets

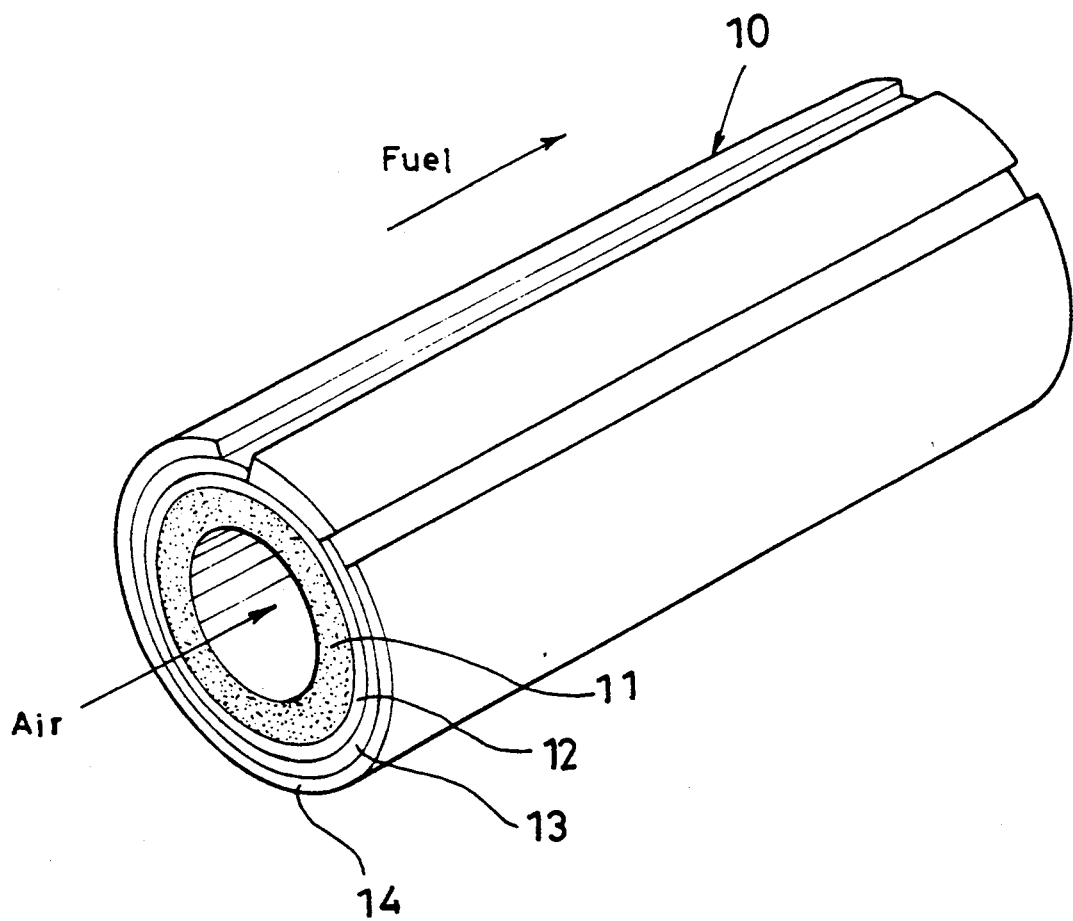

METHOD OF OPERATING A SOLID ELECTROLYTE FUEL CELL

BACKGROUND OF THE INVENTION

The present invention relates to a method of operating a solid electrolyte fuel cell using a light hydrocarbon such as natural gas, naphtha or the like as the fuel.

solid electrolyte fuel cells using light hydrocarbons such as natural gases, naphtha, etc. as fuels and air as the oxidant are well known, and a typical cell configuration for such solid electrolyte fuel cells is disclosed in Japanese Kokai Paten Publication No. 57-130381.

This configuration comprises a tubular porous support and formed serially thereon an inner tubular electrode (air electrode), an electrolyte and an outer electrode (fuel electrode), with air being passed inwardly of said porous support and the fuel over the exterior of the outer electrode.

The prior art fuel cell using the above cell configuration is assembled and operated under the following conditions.

1) The fuel utilization rate is increased (80~85%) and the fuel is not recycled.

2) The air as such is used as the oxidant at the air utilization rate of about 25%, with the necessary cooling being effected on the air (internal) side.

However, in this conventional solid electrolyte fuel cell configuration, the standard output density per unit area is 150 mW/cm$^2$ and the electrical output per unit cell is approximately 20 W. This means that about 50 cells are required for the generation of 1 KW and the consequent high cell cost has been a serious drawback in the commercial implementation of a solid electrolyte fuel cell.

The following may be mentioned as reasons why the output density is not high (or cannot be high).

(1) Since the diffusion resistance generated as the air (oxygen) is passed through the tubular porous support and porous air electrode causes a rapid increase in the internal resistance at a current density of about 250 mA/cm$^2$ or more, the output density cannot be increased.

(2) Since the solid electrolyte is an oxygen ion conductor and the theoretical electromotive voltage drops with an increasing fuel utilization rate, the output density cannot be increased.

In order to attenuate the diffusion resistance mentioned under (1) above, it might be contemplated to increase the degree of porosity of the air electrode. However, if this be done, the ohmic resistance of the air electrode will be increased, and even in a solid electrolyte fuel cell employing the cell configuration taught by Japanese Kokai Patent Publication No. 57-130381, this resistance will be as large as 65% of the total resistance of the cell as a whole. (This value is approximately 8-fold as large as the resistance calculated on the assumption that the air electrode is a dense member.) Therefore, any further improvement can hardly be accomplished by increasing the porosity of the air electrode.

In addition, the prior art solid electrolyte fuel cell has the following drawbacks.

(3) Because of the low theoretical electromotive voltage at the exit, it is ensured that no mixing of the fuel will take place but this entails a large variation in the temperature distribution of the generating chamber.

(4) Because the fuel is not recycled, approximately 15 to 20% of the fuel is wasted.

SUMMARY OF THE INVENTION

It is an object of the present invention to overcome the above-mentioned disadvantages and provide an improved method of operating a solid electrolyte fuel cell with an increased output density and a minimum of fuel loss.

It is another object of the invention to provide a method of operating a solid electrolyte fuel cell featuring a uniform temperature in the generating chamber.

The present invention provides a method of operating a solid electrolyte fuel cell including serially superimposed in the order mentioned, either a porous support adapted to insure the structural integrity of the cell, an air electrode, an electrolyte and a fuel electrode or a porous air electrode which doubles as a support, an electrolyte and a fuel electrode, wherein the air electrode is supplied with oxygen-enriched air and the fuel electrode with a fuel prepared by steam reformation of a hydrocarbon material and this fuel is recycled.

The diffusion resistance is decreased by supplying the air electrode side with the air enriched with oxygen in this manner. Particularly when the oxygen concentration of air is not less than 90 percent by volume, the amount of N$_2$ exhausted by reverse diffusion is decreased to the extent that the diffusion resistance may be virtually disregarded. The oxygen concentration is preferably as high as possible for improving the air utilization rate as well. However, the optimum O$_2$ concentration is chosen within the range of compatibility with the efficiency of an oxygen plant (for example, a PSA plant).

Since the fuel is recycled, the fuel utilization rate per cycle is lowered to increase the theoretical electromotive voltage. Moreover, this recycling brings the fuel utilization rate to nearly 100% as a whole so that the aforementioned loss (15~20%) due to combustion of the residual fuel is eliminated.

The fuel utilization rate per cycle is preferably 10 to 20 percent. If the fuel utilization rate per cycle is less than 10 percent, the recycled gas entering the generating chamber containing an assemblage of cells must be preheated to a fairly high temperature. This is not a welcome practice, for this preheating can hardly be accomplished with the available heat of the high-temperature recycle gas emerging from the generating chamber alone. Conversely, the use of a fuel utilization rate per cycle in excess of 20 percent is also undesirable, for the temperature of the recycle gas entering the generating chamber is then so low as to cause condensation of the water vapor and both the efficiency and current density are sacrificed.

With regard to the heat output during the generation of electricity in a solid electrolyte fuel cell, by far more than one-half of the output, including but being not limited to the heat owing to the entropy on the air electrode side interface of the solide electrolyte, is generated in the region directly associated with the generation of electricity other than the support, so that efficient cooling can be effected by using the recycle fuel gas from the fuel electrode side which is free from the interference of the porous support and porous air electrode.

Furthermore, compared with the conventional tubular reformer, a drastic cost reduction can be effected by mixing the starting material hydrocarbon with the recycle gas and reforming the mixture with steam in an adiabatic reactor.

Furthermore, by performing CO conversion (according to equatin (1)) and decarbonation following the above procedure of mixing the hydrocarbon with the recycle gas and reforming the mixture with steam, carbon precipitation due to the Boudart reaction (according to equation (2)) in the preheating zone at the inlet of the generating chamber containing the cell assemblage is precluded.

$$CO + H_2O \rightarrow CO_2 + H_2 \quad (1)$$

$$2CO \rightleftharpoons C(s) + CO_2 \quad (2)$$

Furthermore, the use of the PSA (pressure swing adsorption) method makes oxygen enrichment feasible with an energy of the order available by the improvement of cell efficiency due to oxygen enrichment.

In addition, in a solid electrolyte fuel cell using the cell configuration which comprises a tubular porous support and serially superimposed thereon an air electrode, an electrolyte and a fuel electrode in the order mentioned or a tubular porous air electrode which doubles a support and as serially superimposed thereon an electrolyte and a fuel electrode in the order mentioned, the recycling of the fuel does not cause carbon precipitation even when the steam/carbon (S/C) ratio at the inlet of the generating chamber containing the aforesaid cell asemblage is $1.0 \sim 2.0$ so that a remarkable improvement in efficiency can be implemented as compared with the prior art (S/C = $2.0 \sim 3.0$).

Furthermore, in a solid electrolyte fuel cell utilizing the cell configuration which comprises either a tubular porous support and serially superimposed thereon an air electrode, an electrolyte and a fuel electrode in the order mentioned or a tubular porous air electrode which doubles as a support and serially superimposed thereon an electrolyte and a fuel electrode, a blow out of the recycle gas, inter alia, agitates the fuel in the generating chamber containing the cell assemblage, thus affording such effects as (1) prevention of cracking due to the generation of thermal stresses, (2) prevention of deterioration due to solid-phase reaction, and (3) decrease of the internal resistance due to an elevated average temperature.

Thus, when the fuel is agitated within the generating chamber, the $H_2O$ produced on generation of electricity can be utilized so that the operation can be performed without entailing the precipitation of carbon even when the S/C ratio at the inlet of generating chamber is 0.5.

The method of operating a solid electrolyte fuel cell of the present invention has the following features and, as such, is of great value.

(1) By the use of oxygen enriched air and of the fuel recycling system, the output density per unit area can be increased by about 6-fold over that of the conventional solid electrolyte fuel operating method.

(2) As the result of utilization of oxygen enriched air, the diffusion resistance can be lowered even if the density of the air electrode is increased (that is to say the porosity of the air electrode is decreased) so that, compared with the prior art, the internal resistance can be reduced to approximately one-half and the output density be approximately doubled.

(3) By using an adiabatic reformer and the PSA method, the initial running cost required for oxygen enrichment and fuel recycling can be held at a minimum.

(4) By increasing the partial $H_2$ pressure by recycling the fuel, an internal reforming can be performed even at an S/C ratio of 2.0 or less, so that the efficiency of electrical generation can be enhanced.

(5) When the fuel is agitated within the generating chamber, the deterioration of cells is precluded by the uniformity of temperature distribution in the generating chamber and the effect of cooling from the fuel side.

BRIEF DESCRIPTION OF THE DRAWINGS

FIG. 2 is a perspective view showing a tubular cell used in the solid electrolyte fuel cell illustrated in FIG. 1.

DETAILED DESCRIPTION OF THE PREFERRED EMBODIMENTS

Figure 1:
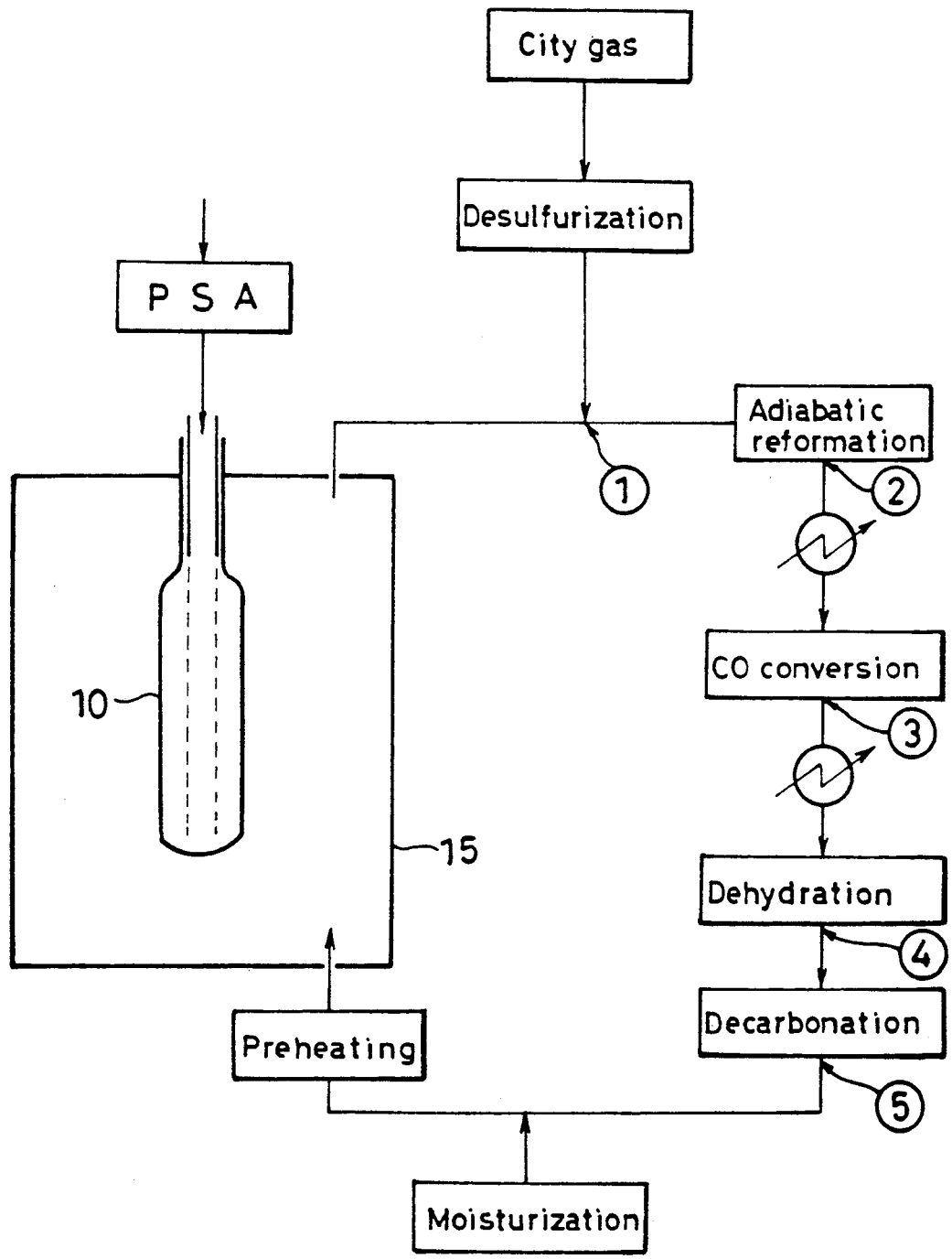
FIG. 1 is a schematic view showing the fuel recycling system in the solid electrolyte fuel cell as an embodiment of the present invention.

The following embodiments are further illustrative and by no means limitative of the invention.

As an embodiment, a solid electrolyte fuel cell was fabricated in accordance with the system illustrated in FIG. 1. In this fuel cell, a tubular cell 10 as depicted in FIG. 2 was employed. This cell 10 comprises a tubular porous support 11 made of, for example, stabilized zirconia alumina and serially formed on the outer periphery thereof an air electrode 12 made of, for example, lanthanum manganate, an electrolyte 13 which is a thin film of, for example, stabilized zirconia, and a fuel electrode 14 made of, for example, nickel-zirconia cermet in the order mentioned. Oxygen-enriched air is passed through the bore of the porous support 11 and the fuel is passed externally of said fuel electrode 14.

In the system illustrated in FIG. 1, the fuel utilization rate in a generating chamber 15 is set at 15%, and 85% of the fuel is distributed to the recycling system. This recycle gas is mixed with the desulfurized city gas as the starting material hydrocarbon, reformed in an adiabatic reactor, and subjected to CO conversion with a Cu-Zn catalyst. The gas is then dehydrated by cooling, decarbonated by the monoethanolamine process and moisturized so that the S/C ratio at the inlet of the generating chamber 15 will be 0.5, and preheated to $600° \sim 650°$ C. before it is returned to the generating chamber 15. In the generating chamber 15, the fuel is agitated by blowout of the recycle gas.

To the air electrode side, oxygen-enriched air prepared by increasing the oxygen concentration to about volume 100% by PSA was supplied.

As the city gas to be mixed with the recycle gas, city gas 13A of the following composition (volume %) was used.

$CH_4$, 88%; $C_2H_6$, 6%; $C_3H_8$, 4%; $C_4H_{10}$, 2%.

The adiabatic reforming of city gas after desulfurization was carried out by the method described in Japanese Patent Application No. 63-318818.

The gas compositions (volume %) at ①  through ⑤ of the recycling system of FIG. 1 are shown below in Table 1.

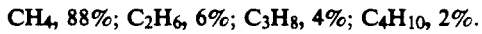

TABLE 1

|   | $H_2$ | $H_2O$ | CO | $CO_2$ | $CH_4$ | $C_{2-4}$ |
|---|------|-------|-----|-------|-------|----------|
| ① | 66.1 | 12.8  | 15.9 | 2.0  | 2.5   | 1.2      |
| ② | 42.5 | 36.2  | 1.9 | 6.8   | 12.7  | 0.0      |
| ③ | 44.3 | 34.3  | 0.0 | 8.7   | 12.7  | 0.0      |

TABLE 1-continued

|   | H$_2$ | H$_2$O | CO | CO$_2$ | CH$_4$ | C$_{2-4}$ |
|---|---|---|---|---|---|---|
| ④ | 64.1 | 5.0 | 0.0 | 12.5 | 18.3 | 0.0 |
| ⑤ | 73.3 | 5.7 | 0.0 | 0.0 | 20.9 | 0.0 |

C$_{2-4}$: C$_2$H$_6$ + C$_3$H$_8$ + C$_4$H$_{10}$

In this example, the output density is 0.96 w/cm$^2$ (0.87~0.93 W/cm$^2$ after correction for the energy required for PSA), the theoretical voltage is 1.009 V, the output voltage is 0.504 V, and the efficiency is 42.5% (by HHV).

In the once-through system with an S/C ratio of 3.0 and a fuel utilization rate of 85%, as a reference example, the output density is 0.15 W/cm$^2$, the output voltage is 0.592 V and the efficiency is 42.5% (by HHV).

Based on the above comparison, the number of cells required for an output of 1 KW in the solid electrolyte fuel cell is only about 1/5 of the number required in the prior art, thus permitting a significant cost reduction. This effect, coupled with the effect of increased density of the air electrode, suggests that the required number of cells may be only about 1/10 as compared with the prior art.

When the fuel cell was operated without agitation of the fuel within the generator 15 under otherwise the same conditions as above, there was no precipitation of carbon at an S/C ratio of 1.0 but the carbon precipitation was found at S/C<1.0.

The heat balance, preheating temperature at the inlet of the generating chamber, and efficiency in the recycling system at the fuel utilization rate per cycle of 5%, 10%, 15%, 20% or 25% are shown in Table 2.

In these examples, oxygen-enriched air with an oxygen concentration of nearly 100 volume % is supplied to the air electrode side and the recycle gas mixed with city gas 13A is supplied to the fuel electrode side. The outlet temperature of the adiabatic reformer is set at 630° C., the CO concentration immediately after CO conversion at 0.3 volume %, the S/C ratio at the inlet of the generator 15 at 1.0, and the cell temperature at 1,000° C. The output voltage is ½ of the theoretical voltage and is 0.536 V at the fuel utilization rate per cycle of 5%, 0.519 V at 10%, 0.506 V at 15%, 0.497 V at 20%, and 0.489 V at 25%.

TABLE 2

| Fuel utilization rate (%) | 5 | 10 | 15 | 20 | 25 |
|---|---|---|---|---|---|
| Utilizable high-temperature exhaust heat*$^1$ (W/output W) | | | | | |
| Inlet of reformer | 3.30 | 1.57 | 0.88 | 0.62 | 0.37 |
| Inlet of CO conversion plant | 2.56 | 1.30 | 0.96 | 0.75 | 0.65 |
| Total | 5.86 | 2.87 | 1.84 | 1.37 | 1.02 |
| Amount of preheating necessary for a cycle*$^2$ (W/output W) | | | | | |
| O$_2$ preheating | 0.04 | 0.04 | 0.04 | 0.04 | 0.04 |
| Preheating at the inlet of generator | 5.73 | 2.33 | 1.06 | 0.46 | 0.01 |
| Total | 5.77 | 2.37 | 1.10 | 0.50 | 0.05 |
| Preheating temperature at the inlet of generating chamber (°C.) | 1051 | 861 | 603 | 374 | 62 |
| Efficiency (% by HHV) | 46 | 45 | 44 | 43 | 42 |

*$^1$The utilizable high-temperature exhaust heat per unit cell capacity at the inlet of the reformer or CO conversion plant
*$^2$The amount of preheating per unit cell capacity required for O$_2$ preheating or preheating at the inlet of the generating chamber It will be apparent from Table 2 that when the fuel utilization rate per cycle is 5%, the recycle gas entering the generator must be preheated to a temperature not lower than 1,000° C. Then, with the heat loss being taken into account, it is difficult to preheat the recycle gas exclusively with the available heat of the recycle gas. When the fuel utilization rate per cycle is 25%, the temperature of the recycle gas entering the generating chamber is lower than 100° C. so that the water vapor in the recycle gas may condense and the efficiency is sacrificed.

It should be understood that the cell configuration used in the solid electrolyte fuel cell of the present invention need not necessarily be the one illustrated in FIG. 2. For example, instead of using a support as such, it may be so arranged that the porous air electrode doubles as a support. The cell may also be of a flat planar configuration.

What is claimed is:

1. A method of operating a solid electrolyte fuel cell including a plurality of cells each comprising either a porous support adapted to provide a cell with structural integrity and serially superimposed thereon an air electrode, an electrolyte and a fuel electrode in the order mentioned or a porous air electrode which doubles as a support and serially superimposed thereon an electrolyte and a fuel electrode in the order mentioned, comprising supplying oxygen-enriched air to said air electrode, preparing a fuel by steam reformation of a hydrocarbon followed by subjecting the reformed hydrocarbon to CO conversion, dehydration and decarbonation in the order mentioned, then supplying said fuel to said fuel electrode, recycling said fuel, and mixing the recycled fuel with the hydrocarbon prior to the steam reformation.

* * * * *